US007981388B2

(12) United States Patent
Ivanov et al.

(10) Patent No.: US 7,981,388 B2
(45) Date of Patent: Jul. 19, 2011

(54) PROCESS FOR THE PURIFICATION OF LITHIUM SALTS

(75) Inventors: Sergei Vladimirovich Ivanov, Schnecksville, PA (US); William Jack Casteel, Jr., Emmaus, PA (US); Wade H. Bailey, III, Emmaus, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 1131 days.

(21) Appl. No.: 11/710,116

(22) Filed: Feb. 23, 2007

(65) Prior Publication Data

US 2007/0189946 A1    Aug. 16, 2007

Related U.S. Application Data

(63) Continuation-in-part of application No. 11/197,478, filed on Aug. 5, 2005, now Pat. No. 7,465,517.

(60) Provisional application No. 60/603,576, filed on Aug. 23, 2004.

(51) Int. Cl.
C01D 15/00 (2006.01)

(52) U.S. Cl. ............... 423/179.5; 423/181; 423/203; 210/679; 210/681; 23/295 R; 502/415

(58) Field of Classification Search ............... 423/181, 423/179.5, 203; 210/679, 681; 23/295 R; 502/415
See application file for complete search history.

(56) References Cited

U.S. PATENT DOCUMENTS

| 4,020,240 | A | | 4/1977 | Schlaikjer |
| 4,071,664 | A | | 1/1978 | Dey |
| 4,139,680 | A | | 2/1979 | Schlaikjer |
| 4,201,839 | A | | 5/1980 | Johnson et al. |
| 4,274,834 | A | | 6/1981 | Brown et al. |
| 4,331,743 | A | | 5/1982 | Dey et al. |
| 4,859,343 | A | * | 8/1989 | Frianeza-Kullberg et al. .................... 210/679 |
| 5,154,279 | A | | 10/1992 | Hansch |
| 5,154,989 | A | | 10/1992 | Howard et al. |
| 5,478,674 | A | | 12/1995 | Miyasaka |
| 5,643,695 | A | | 7/1997 | Barker et al. |
| 5,714,279 | A | | 2/1998 | Zajac, Jr. et al. |
| 5,849,432 | A | | 12/1998 | Angell et al. |
| 5,919,287 | A | | 7/1999 | Moreau |
| 6,033,808 | A | | 3/2000 | Salmon et al. |
| 6,136,287 | A | * | 10/2000 | Horne et al. .................. 423/599 |
| 6,159,640 | A | | 12/2000 | Appel et al. |
| 6,346,351 | B1 | | 2/2002 | Yde-Andersoen et al. |
| RE37,700 | E | | 5/2002 | St. Aubyn Hubbard et al. |
| 6,448,447 | B1 | | 9/2002 | Strauss et al. |
| 6,514,474 | B1 | | 2/2003 | Kikuyama et al. |
| 6,521,375 | B1 | | 2/2003 | Hwang et al. |
| 6,537,697 | B2 | | 3/2003 | Kida et al. |
| 6,696,202 | B2 | | 2/2004 | Arai |
| 6,781,005 | B1 | | 8/2004 | Casteel, Jr. et al. |
| 6,852,446 | B2 | | 2/2005 | Barbarich |
| 7,311,993 | B2 | | 12/2007 | Ivanov et al. |
| 7,348,103 | B2 | | 3/2008 | Ivanov et al. |
| 7,465,517 | B2 | | 12/2008 | Ivanov et al. |
| 2002/0028388 | A1 | | 3/2002 | Lee |
| 2002/0055041 | A1 | | 5/2002 | Kobayshi et al. |
| 2002/0177044 | A1 | | 11/2002 | Yagi et al. |
| 2003/0129497 | A1 | | 7/2003 | Yamamoto et al. |
| 2004/0029010 | A1 | | 2/2004 | Sada et al. |
| 2004/0072067 | A1 | | 4/2004 | Minami et al. |
| 2005/0053841 | A1 | | 3/2005 | Ivanov et al. |
| 2005/0064288 | A1 | | 3/2005 | Ivanov et al. |
| 2005/0227143 | A1 | | 10/2005 | Amine et al. |
| 2006/0040180 | A1 | | 2/2006 | Ivanov et al. |
| 2006/0204843 | A1 | | 9/2006 | Ivanov et al. |
| 2007/0048605 | A1 | * | 3/2007 | Pez et al. ................ 429/199 |

FOREIGN PATENT DOCUMENTS

| EP | 1089371 A1 | 4/2001 |
| EP | 1 513 215 A2 | 3/2005 |
| EP | 1 630 895 A2 | 3/2006 |
| FR | 2 523 770 A | 3/1982 |
| GB | 2 083 273 A | 3/1982 |
| JP | 52-32539 A2 | 3/1977 |
| JP | 53-123842 A | 10/1978 |
| JP | 55-66873 A | 5/1980 |
| JP | 57-74974 A | 5/1982 |
| JP | 3-285264 A | 12/1991 |
| JP | 2004-179136 A2 | 6/2004 |
| JP | 2004-235057 A | 8/2004 |
| JP | 2005-158695 A2 | 6/2005 |
| KR | 10-2006-0050582 A | 5/2006 |
| TW | 249869 | 2/2006 |
| WO | 8303322 A | 9/1983 |
| WO | 2004/070863 A1 | 8/2004 |

OTHER PUBLICATIONS

Abraham, K. M. et al; "Some Chemistry in the Li/SOCl. Cell;" Journal of the Elecrochemical Society; 1980, vol. 127, p. 2091-2096.
Bowden, W.; Electrochemical Oxidaton of Polyhedral Boron Halide Anions; Journal of Electrochemical Society. vol. 129, 1982; p. 1249-1252.
Handbook of Batteries (3rd edition); edited by Linden: Reddy, McGraw-Hill; 2002.
Xu, Kang; "Nonaqueous Liquid Electrolyte for Lithium-Based Rechargeable Batteries;" Chemical Review; 104, 2004, pp. 4303-4417.
SAFT.com and batterspace.com web pages.

(Continued)

Primary Examiner — Steven Bos
(74) Attorney, Agent, or Firm — Michael K. Boyer

(57) ABSTRACT

The present invention relates to lithium secondary batteries comprising a negative electrode, a positive electrode, a separator and a lithium-based electrolyte carried in an aprotic solvent, and to the electrolyte compositions, and to methods for purifying battery active materials. The electrolyte comprises at least one solvent and a lithium salt of the formula:

$$Li_2B_{12}F_xH_{12-x-y}Z_y$$

where x+y is from 3 to 12, and x and y are independently from 0 to 12, and Z comprises at least one of Cl and Br.

10 Claims, 2 Drawing Sheets

OTHER PUBLICATIONS

S. Mori, et al., "Chemical Properties of Various Organic Electrolytes for Lithium Rechargeable Batteries . . . 1. Characterization of Passivating Layer Formed on Graphite in Alkyl Carbonate Solutions", Journal of Power Sources, 68 pp. 59-64 (1997).

D. Aurbach, et al., "Recent Studies on the Correlation Between Surface Chemistry, Morphology, Three-Dimensional Structures and Performance of Li and Li—C Intercalation Anodes in Serveral Important Electrolyte Systems", Journal of Power Sources 68, pp. 91-98 (1997).

S. Flandrois, et al., "Carbon Materials for Lithium-ion Rechargeable Batteries", Carbon 37, pp. 165-180 (1999).

Sergei V. Ivanov, et al., Synthesis and Stability of Reactive Salts of Dodecafluorocloso-dodecaborate(2-), J. American Chemical Society, 2003, vol. 125, No. 16 pp. 4694-4695.

Abboud, J.L.M, et al., "Critical Compliation of Scales of Solvent Paramenters, Part 1. Pure Non-Hydrogen Bond Donor Solvents"; Pure Appl. Chem., vol. 71, No. 4 pp. 645-718, 1999; pp. 645-718.

Ivanov, et al; U.S. Appl. No. 11/939,850, filed Nov. 13, 2007.

* cited by examiner

US 7,981,388 B2

PROCESS FOR THE PURIFICATION OF LITHIUM SALTS

The application is a continuation in part of U.S. application Ser. No. 11/197,478, filed on Aug. 5, 2005 now U.S. Pat. No. 7,465,517. Application Ser. No. 11/197,478 claims the benefit of U.S. Provisional Application No. 60/603,576, filed on Aug. 23, 2004. The disclosure of application Ser. Nos. 11/197,478 and 60/603,576 are incorporated by reference.

CROSS REFERENCE TO RELATED PATENTS AND PATENT APPLICATIONS

The subject matter of this invention is related to the following commonly assigned patents and patent applications: U.S. Pat. No. 6,781,005 B1, entitled "Process for the Fluorination of Boron Hydrides", and U.S. Patent Application Publication Nos. US20050053841 A1 and US20050064288 A1, both entitled "Polyfluorinated Boron Cluster Anions for Lithium Electrolytes". The disclosure of this patent and patent applications is hereby incorporated by reference.

BACKGROUND OF THE INVENTION

Lithium secondary batteries, by virtue of the large reduction potential and low molecular weight of elemental lithium, offer a dramatic improvement in power density over existing primary and secondary battery technologies. Here, lithium secondary battery refers to both batteries containing metallic lithium as the negative electrode and batteries which contain a lithium ion host material as the negative electrode, also known as lithium-ion batteries. By secondary battery it is meant a battery that provides for multiple cycles of charging and discharging. The small size and high mobility of lithium cations allow for the possibility of rapid recharging. These advantages make lithium batteries ideal for portable electronic devices, e.g., cell phones and laptop computers. Recently, larger size lithium batteries have been developed and have application for use in the hybrid vehicle market.

The following patents are representative of lithium batteries and electrochemical cells:

U.S. Pat. No. 4,201,839 discloses an electrochemical cell based upon alkali metal-containing anodes, solid cathodes, and electrolytes where the electrolytes are closoborane compounds carried in aprotic solvents. Closoboranes employed are of the formula $Z_2BnXn$ and $ZCRBmXm$ wherein Z is an alkali metal, C is carbon, R is a radical selected from the group consisting of organic hydrogen and halogen atoms, B is boron, X is one or more substituents from the group consisting of hydrogen and the halogens, m is an integer from 5 to 11, and n is an integer from 6-12. Specifically disclosed examples of closoborane electrolytes employed in the electrochemical cells include lithium bromooctaborate, lithium chlorodecaborate, lithium chlorododecabate, and lithium iodododecaborate.

U.S. Pat. No. 5,849,432 discloses electrolyte solvents for use in liquid or rubbery polymer electrolyte solutions based upon boron compounds with Lewis acid characteristics, e.g., boron linked to oxygen, halogen atoms, and sulfur. A specific example of an electrolyte solution comprises lithium perchlorate and boron ethylene carbonate.

U.S. Pat. No. 6,346,351 discloses secondary electrolyte systems for a rechargeable battery of high compatibility towards positive electrode structures based upon a salt and solvent mixture. Lithium tetrafluoroborate and lithium hexafluorophosphate are examples of salts. Examples of solvents include diethyl carbonate, dimethoxyethane, methylformate, and so forth. In the background, there is disclosed known electrolytes for lithium batteries, which include lithium perchlorate, lithium hexafluoroarsenate, lithium trifluoromethylsulfonate, lithium tetrafluoroborate, lithium bromide, and lithium hexafluoroantimonate electrolytes incorporated in solvents.

U.S. Pat. No. 6,159,640 discloses electrolyte systems for lithium batteries used in electronic equipment such as mobile phones, laptop computers, camcorders, etc based upon fluorinated carbamates. A variety of fluorinated carbamate salts, e.g., trifluoroethyl-N, N-dimethylcarbamate is suggested.

U.S. Pat. No. 6,537,697 discloses lithium secondary battery using a nonaqueous electrolyte including lithium tetrakis (pentafluorophenyl)borate as an electrolyte salt.

U.S. Pat. No. 6,514,474 discloses the need for removing traces of water and acid from lithium hexafluorophosphate salt to be used in lithium battery applications and a purification process.

The disclosure of the previously identified patents is hereby incorporated by reference.

As represented above a wide variety of lithium-based electrolytes comprising a lithium salt for lithium batteries are disclosed and, although having use in many electronic applications, they are faced with problems associated with safety, oxidative stability, thermal stability, and so forth. Fluorinated electrolyte salts have had the additional problem that deleterious and toxic HF can be produced on compound breakdown. The following are some of the deficiencies associated with specific electrolyte salts: lithium hexafluorophosphate fails primarily on the basis that it is unstable, generating HF, which leads to electrode corrosion, particularly with $LiMn_2O_4$ cathode materials; lithium perchlorate has relatively low thermal stability leading to explosive mixtures above 100° C.; lithium hexafluoroarsenate has a problem of arsenic toxicity; and lithium triflate lead to significant corrosion of aluminum current collectors typically used in lithium ion batteries.

BRIEF SUMMARY OF THE INVENTION

The present invention relates to lithium secondary batteries comprising a negative electrode, a positive electrode and an electrolyte comprising a combination of at least one solvent and at least one lithium based electrolyte salt of the formula:

where x+y is from 3 to 12, and x and y are independently from 0 to 12, and Z comprises at least one of Cl and Br.

Some of the advantages associated with the use of the fluorinated lithium dodecaborate salt for forming the lithium-based electrolyte may include:

an ability to use a lithium based salt for an electrolyte solution which has electrochemical, thermal, and hydrolytic stability;

an ability to use a salt with acceptably low levels of impurities harmful to lithium ion cells (e.g., substantially free of water, hydroxyl moieties, metal cations including alkali metals and hydrogen fluoride);

an ability to use a lithium electrolyte solution which can be used at a low lithium based salt concentration, e.g., one-half the concentration of many other lithium-based salts, e.g., $LiPF_6$; and, an ability to form low viscosity, low impedance lithium electrolyte solutions which can be recycled.

DETAILED DESCRIPTION OF THE INVENTION

Figure 1:
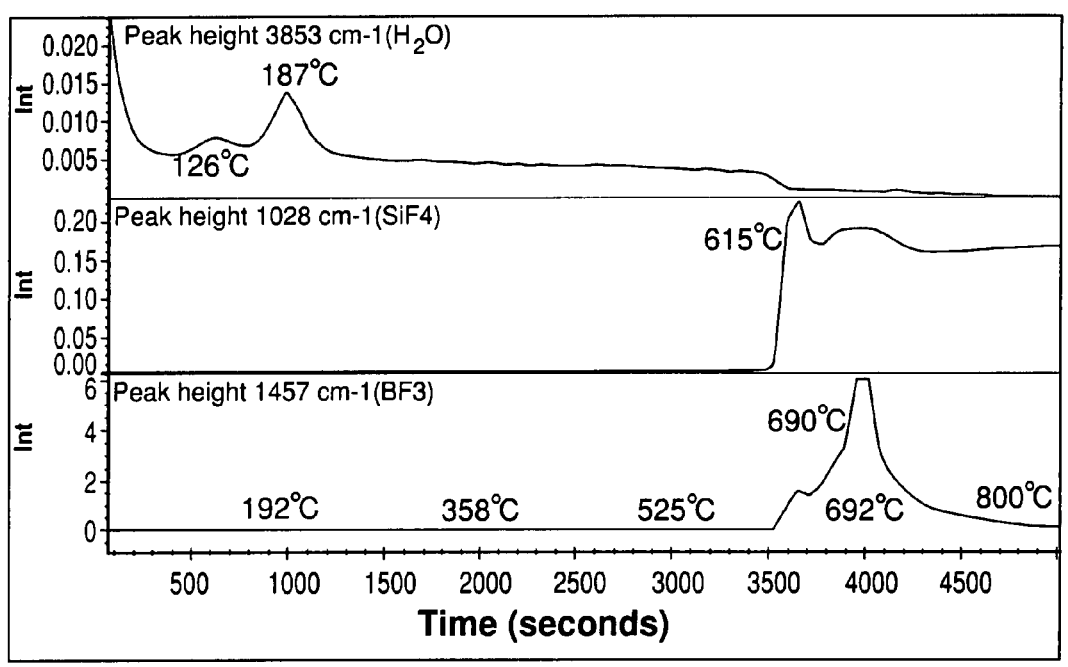
FIG. 1 is a Thermogravimetric Analysis in which volatiles are analyzed by IR spectroscopy.

The instant invention relates to a lithium secondary battery, an electrolyte containing lithium ions, high purity lithium containing salts and methods for making and using the salts. Two desirable properties for lithium battery electrolyte solutions are: (a) a high conductivity in a non-aqueous ionizing solution, and (b) chemical stability to both heat, hydrolysis and to electrochemical cycling over a wide potential range. Other desired features of lithium electrolyte solutions include: high flash point; low vapor pressure; high boiling point; low viscosity; good miscibility with solvents customarily employed in batteries, especially ethylene carbonate, propylene carbonate and alpha-omega-dialkyl glycol ethers; good electrical conductivity of their solutions over a wide temperature range, and tolerance to initial moisture content.

The present lithium secondary battery is characterized in that the lithium based electrolyte salt for forming lithium electrolyte solutions is based upon a lithium fluorododecaborate comprising:

$$Li_2B_{12}F_xH_{12-x-y}Z_y$$

where x+y is from 3 to 12, and x and y are independently from 0 to 12, and Z is at least one of Cl and Br. Specific examples of lithium based dodecaborates comprise at least one member selected from the group consisting of $Li_2B_{12}F_5H_7$, $Li_2B_{12}F_6H_6$, $Li_2B_{12}F_7H_5$, $Li_2B_{12}F_8H_4$, $Li_2B_{12}F_9H_3$, $Li_2B_{12}F_{10}H_2$, $Li_2B_{12}F_{11}H$ and mixtures of salts with varying x such that the average x is equal to or greater than 5, or equal to 9 or 10, or $Li_2B_{12}F_xCl_{12-x}$, and $Li_2B_{12}F_xBr_{12-x}$ where x is 10 or 11, or $Li_2B_{12}FCl_2H_9$, $Li_2B_{12}Cl_3H_9$, $Li_2B_{12}F_2Cl_3H_7$, $Li_2B_{12}Cl_5H_7$ and $Li_2B_{12}FCl_6H_5$; and mixtures thereof.

The lithium salt employed for forming electrolytes solutions for use in lithium batteries can be formed by fluorinating hydrododecaborates to provide a fluorododecaborate having at least 5, usually at least 8 and typically at least 10 but not more than 12 or more hydrogen atoms replaced with fluorine (average basis). Metathesis using lithium hydroxide can provide the lithium salt. This reaction is normally conducted in a liquid medium. In direct fluorination, fluorine is usually diluted with an inert gas, e.g., nitrogen. Fluorine concentrations from about 10 to about 40% by volume are commonly employed. If further halogenation is desired, the partially fluorinated hydridoborate can be reacted with the desired halogen, e.g., chlorine or bromine.

To facilitate formation of the lithium fluorododecaborates as electrolyte salts, direct fluorination of the lithium hydrododecaborate can be conducted in an acidic liquid medium, e.g., an acidic liquid medium or carrier such as neat or anhydrous HF reduced in acidity by the incorporation of a weak base. While any suitable acid can be employed, examples of suitable acids comprise at least one member selected from the group consisting of formic, acetic, trifluoroacetic, dilute sulfuric triflic, and sulfonic acids hydrohalic ($HCl_{(aq)}$, $HBr_{(aq)}$, $HI_{(aq)}$, and $HF_{(aq)}$), and mixtures thereof. The addition of buffering salts, e.g., alkali metal fluorides such as potassium and sodium fluoride, also can reduce the acidity of neat HF in the fluorination reaction. A Hammett acidity, $H_o$, between $0 > H_o > -11$ is useful as an acidic medium for effecting fluorination.

Radical scavengers can be used in the fluorination of lithium hydrododecaborates to reduce byproduct formation and improve reaction efficiency. Without wishing to be bound by any theory or explanation, it is believed that radical scavengers can limit the formation of hydrogen peroxide, or HOF which may be generated with fluorine. Radical scavengers can be used to inhibit the side-reaction of fluorine with the solvent, thereby improving fluorination efficiency. Examples of radical scavengers comprise oxygen, nitroaromatics, and mixtures thereof. One method for employing a radical scavenger comprises introducing a relatively small amount of air to the liquid medium.

Fluorinating hydridododecaborate anion can be conducted under conditions sufficient to maintain liquid phase conditions. Fluorination of the hydridododecaborate anion can be performed at a temperature from about −30 to about 100° C., typically from about 0 to about 20° C. Pressures during fluorination are such as to maintain liquid phase conditions, and typically atmospheric for fluorinating the dodecaborate anion.

Lithium ion cells can be sensitive to impurities in any of the components. In one aspect of the invention the lithium containing salts, electrolytes, precursors thereof, among other materials related to battery active materials, are substantially free of impurities. By "substantially free" it is meant that the lithium salts and electrolyte comprising such salts have less than about 500 ppm, normally less than about 100 ppm (e.g., 10-20 ppm) of active hydrogens such as hydroxyl groups (e.g., OH and other moieties). These impurities can react with the electrodes themselves, or when present with a hydrolyzable salt such as lithium hexafluorophosphate, lead to HF generation, which, in turn, can corrode electrode materials. As a result, the inventive salts and electrolytes are also substantially free of hydrogen fluoride (HF). Typical OH containing impurities are water and alcohols in the electrolyte salts and solvents.

In another aspect of the invention, the inventive salts, electrolytes, precursors thereof, among other materials related to battery active materials, are also substantially free of predetermined metal cations impurities (e.g., in the case of a lithium salt the salt would be substantially free of alkali metals other than lithium, or potassium salt that is substantially free of sodium) By substantially free of metal cations, it is meant that the salts and electrolytes contain less than about 500, normally less than about 100 ppm (e.g., 10-20 ppm) of such non-lithium cations. Without wishing to be bound by any theory or explanation, it is believed that the presence of such non-lithium salts, because the reduced solubility of sodium, potassium and cesium salts, can lead to their salting out with subsequent short circuiting of the cell.

One or more of the foregoing impurities may be removed from the previously identified materials by at least one of the following methods:

a) dissolving the material in an aprotic organic solvent to form a solution and passing said solution through an adsorbent (e.g., alumina column), b) dissolving the material in a solvent to form a solution, and passing said solution through a cation exchange medium (e.g., a column in $Li^+$ form), c) drying the material at a temperature and under conditions sufficient to volatize the impurity (e.g., a temperature greater than the than about 180° C. under vacuum or nitrogen purge), d) dissolving the material in an aprotic organic solvent to form a solution and passing said solution through a sieve (e.g., Li-substituted molecular sieve).

These methods can be repeated, or employed individually or sequentially in order to obtain a material having the desired level of impurity. These methods can produce materials that are substantially free of OH groups, HF and metal cations.

In one aspect of the invention, impurities may be removed from a salt comprising $B_{12}F_xH_{12-x-y}Z_y$ (2-) anion and/or an electrolyte containing lithium salt of the anion by at least one of the following methods:

a) dissolving a salt comprising $B_{12}F_xH_{12-x-y}Z_y$ (2-) anion in an organic solvent to form a solution and treating the solution with an adsorbent which has higher affinity for impurities compare to the adsorbent affinity to the product b) dissolving a salt comprising $B_{12}F_xH_{12-x-y}Z_y$ (2-) anion in a solvent to form a solution, and passing said solution through a cation exchange column in $Li^+$ form, c) drying lithium salt comprising $B_{12}F_xH_{12-x-y}Z_y$ (2-) anion at greater than about 180° C. under vacuum or nitrogen purge, d) dissolving lithium salt comprising $B_{12}F_xH_{12-x-y}Z_y$ (2-) anion salt in an aprotic organic solvent to form a solution and passing said solution through a Li-substituted molecular sieve.

For removing hydroxyl or —OH impurities where the hydroxyl group is bound directly to the dodecaborate anion such as $B_{12}F_{11}(OH)$ (2-), a salt comprising $B_{12}F_xH_{12-x-y}Z_y$ (2-) anion and at least one cation, at least one useful solvent and at least one adsorbent are selected so the adsorbent has greater affinity to the salts of the impurities in comparison to the adsorbent affinity to the salts of $B_{12}F_xH_{12-x-y}Z_y$ (2-) anion.

While any suitable cation can be employed, a useful cation comprises at least one member selected from the group of alkali or alkali earth metals. Such metals can allow the adsorbent to have greater affinity to the specific salt of the impurities in comparison to the salt of the desired product. The cation could also be selected so that the total purification process to produce $Li_2B_{12}F_xH_{12-x-y}Z_y$ from the precursor hydridododecaborate involves the least amount of steps. For example, when $Li_2B_{12}F_xH_{12-x-y}Z_y$ is produced from a precursor comprising $K_2B_{12}H_{12}$, potassium or lithium salts are typically used as the salts for an adsorption step of the purification process. For example, when $Li_2B_{12}F_xH_{12-x-y}Z_y$ is produced from a precursor comprising $Na_2B_{12}H_{12}$, sodium or lithium salts are typically used as the salts for an adsorption step of the purification process.

While any suitable organic solvent can be employed, examples of suitable solvents comprise at least one member selected from the group consisting of ketones, nitriles, carbonates, esters, alcohols and mixtures thereof. The salt concentration in the solution ranges from about 0.1 to about 50 weight %.

A solution containing an impurity may be treated with an adsorbent comprising at least one member selected from the group comprising alumina (aluminum oxide), titania (titanium oxide), silica and carbon to selectively remove impurities from the solution. The absorbent can also be coated or supported by another material. Aluminum oxide acidity is selected to achieve the most efficient removal of impurities. For example, acidic (pH of aqueous suspension is ~4.5), weakly acidic (pH of aqueous suspension is ~6.0), neutral (pH of aqueous suspension is ~7.0) and basic (pH of aqueous suspension is ~9.5) alumina can be employed. The adsorbent concentration in the solution ranges from about 0.1 to about 50 weight %. The mixture of adsorbent and the solution may be agitated for about 0.5 to about 24 hours and adsorbent may be removed by filtration. To improve the efficiency of purification process the solution may be eluted via a column packed with the adsorbent. Adsorbent may be used in powder or granular form. Powder form of adsorbent may allow faster adsorption rate while granular adsorbent may provide faster elution rate in the continuous column processes.

In one aspect of this invention, a potassium salt of $B_{12}F_xH_{12-x-y}Z_y$ (2-) anion containing from: i) about 0.02 mol % —OH substituted dodecaborate anion (~10 ppm hydroxyl group impurity) to 10 mol % —OH substituted anion (~5000 ppm hydroxyl group impurity) can be dissolved in at least one organic solvent. The solvated salt can be eluted through a column containing neutral or basic alumina at room temperature under atmospheric pressure, vacuum or elevated pressure between about −20 and about 80° C.

In another aspect of this invention a lithium salt containing from about 0.02 mol % —OH substituted dodecaborate anion (~10 ppm hydroxyl group impurity) to 10 mol % —OH substituted anion (~5000 ppm hydroxyl group) impurity can be dissolved in at least one aprotic organic solvent. The solvated salt is eluted through a column containing neutral alumina at room temperature under atmospheric pressure, vacuum or elevated pressure between about −20 and about 80° C. If a hydrophobic ketone solvent is used (e.g., such as 5-methyl-2-hexanone), the purified salt may be extracted from the aprotic organic solvent using water. Residual organic solvent in the aqueous product solution may be removed by extraction with an even less polar organic solvent, e.g., hexanes. Removal of water can provide a purified salt containing less than about 100 ppm and usually less than about 10 ppm bound-hydroxyl group impurity.

The salt as well as other battery related materials can also be purified by removing metal cation impurities including alkali metal impurities. In one aspect an aqueous solution comprising the lithium fluorododecaborate containing between about 100 ppm and about 10 weight % (100,000 ppm) of sodium or potassium is eluted via a column with cation-exchange resin (e.g., DOWEX 50WX8-200), in its $Li^+$ form, at a temperature between about 0 and about 80° C., under atmospheric pressure, vacuum or elevated pressure. After removing water from the eluent, the purified salt lithium salt contains less than about 100 ppm of sodium or potassium, as determined by ICP/MS.

In one aspect of the invention, the amount of water impurity in the battery materials such as a lithium salt (e.g., a salt containing >1000 ppm water and bound —OH), can be reduced to less than about 200 ppm and typically below about 20 ppm by grinding and drying. For example, the salt is ground with a mortar and pestle, and dried in a vacuum oven under a dynamic vacuum of less than about 100 mTorr at a temperature of about 150 to about 200° C. for approximately 4 hrs. This step produces a lithium salt product containing between about 200 to about 1,000 ppm water. TGA/IR analysis shows a drying temperature of greater than about 180° C. and usually greater than about 220° C. is needed for efficient drying. The lithium salt is further ground and loaded into a vessel (e.g., a drying column), which can be heated and allows for a dry, inert gas to be purged through the lithium salt at sufficient rate to fluidize or cause percolation of the bed of salt. Dry nitrogen is suitable as an inert gas and the vessel is typically heated to between about 230 to about 280° C. After about 3 to about 72 hrs, the lithium salt was analyzed (i.e., by Karl-Fischer analysis), and determined to contain between about 1 to about 50 ppm water, and usually about 5 to about 20 ppm water.

Alternatively, an electrolyte solution that comprises a combination of about 0.1 to about 25 weight % of the lithium salt and any aprotic organic solvent or combination of solvents, and containing from about 20 to about 100 ppm water, may be dried. The solution is stored over dry, lithium substituted molecular sieves for about 1 to about 72 hrs. While any suitable molecular sieves can be used, examples of suitable molecular sieves comprise 3 A through 5 A and normally lithium cation exchanged versions of these. After this treatment the electrolyte solution typically contains less than about 20 ppm water and usually less than about 10 ppm water. When similarly impure (e.g., about >20 to >100 ppm) electrolyte solutions comprising $LiPF_6$ combined with aprotic organic solvents were dried by using molecular sieves, hydrolysis of the $PF_6$ anion was observed. Unlike $LiPF_6$, the inventive salt is stable with respect to such molecular sieves.

Typically, in order to obtain an electrolyte for a lithium battery, the inventive lithium containing salt is combined with at least one aprotic solvent. Typically, these aprotic solvents are anhydrous, and anhydrous electrolyte solutions are desirable, and in some cases organic. While any suitable solvent can be employed, examples of aprotic solvents or carriers for forming the electrolyte systems can comprise at least one member selected from the group consisting of dimethyl carbonate, ethyl methyl carbonate, diethyl carbonate, methyl propyl carbonate, ethyl propyl carbonate, dipropyl carbonate, bis(trifluoroethyl) carbonate, bis(pentafluoropropyl) carbonate, trifluoroethyl methyl carbonate, pentafluoroethyl methyl carbonate, heptafluoropropyl methyl carbonate, perfluorobutyl methyl carbonate, trifluoroethyl ethyl carbonate, pentafluoroethyl ethyl carbonate, heptafluoropropyl ethyl carbonate, perfluorobutyl ethyl carbonate, etc., fluorinated oligomers, dimethoxyethane, triglyme, dimethylvinylene carbonate, tetraethyleneglycol, dimethyl ether, polyethylene glycols, sulfones, and gamma-butyrolactone; and mixtures thereof.

In one aspect of the invention, the electrolyte system of the present invention can comprise an aprotic gel polymer carrier/solvent. While any suitable polymer can be employed, examples of suitable gel polymer carrier/solvents comprise at least one member selected from the group consisting of polyethers, polyethylene oxides, polyimides, polyphosphazines, polyacrylonitriles, polysiloxanes, polyether grafted polysiloxanes, derivatives of the foregoing, copolymers of the foregoing, crosslinked and network structures of the foregoing, blends of the foregoing, which are added an appropriate ionic electrolyte salt. Other gel-polymer carrier/solvents can comprise those prepared from polymer matrices derived from polypropylene oxides, polysiloxanes, sulfonated polyimides, perfluorinated membranes (Nafion™ resins), divinyl polyethylene glycols, polyethylene glycol-bis-(methyl acrylates), polyethylene glycol-bis(methyl methacrylates), derivatives of the foregoing, copolymers of the foregoing, crosslinked and network structures of the foregoing; and mixtures thereof.

A combination or solution comprising at least one aprotic solvent and at least one fluorinated lithium dodecaborate salt employed for forming the lithium based electrolyte for the lithium battery typically will have a concentration of lithium fluorododecaborate of at least about 0.01 to about 1 molar and typically from about 0.1 to about 0.6 molar (e.g., about 0.2 to about 0.5 molar). In some cases, electrolytes formed from lithium based fluoroborates having an increased concentration of halogen atoms other than fluorine may show an increase viscosity relative to the lithium fluorododecaborates having higher fluorine content.

Other lithium based salts can be used in combination with the lithium based fluorododecaborates, e.g. $LiPF_6$, lithium perchlorate, lithium hexafluoroarsenate, lithium trifluoromethylsulfonate, lithium tetrafluoroborate, lithium bromide, and lithium hexafluoroantimonate, and mixtures thereof. The inventive salts can be used in combination with other salts including, without limitation, hydrolyzable salts such as $LiPF_6$ in any suitable amounts. Typically, the amount of such additional salts ranges from about 0.01 M to about 1.5 M.

A lithium battery employing the lithium fluorododecaborate electrolyte can employ any suitable cathode and anode. In forming the lithium battery, the negative electrodes for use in a lithium secondary battery typically is non-metallic and can be based upon non-graphitizing carbon, natural or artificial graphite carbon, or tin oxide, silicon, or germanium compounds. Any of the conventional anode compositions may be used in combination with the inventive lithium fluorododecaborate electrolytes.

The positive electrode for use in lithium secondary batteries typically is based upon a lithium composite oxide with a transition metal such as cobalt, nickel, manganese, among others and mixtures thereof, or a lithium composite oxide, part of whose lithium sites or transition metal sites are replaced with cobalt, nickel, manganese, aluminum, boron, magnesium, iron, copper, among others and mixtures thereof. or iron complex compounds such as ferrocyan blue, berlin green, among others and mixtures thereof. Specific examples of lithium composites for use as positive electrodes include $LiNi_{1-x}Co_xO_2$ and lithium manganese spinel, $LiMn_2O_4$.

In the event a separator is employed, the separator for the lithium battery can comprise a microporous polymer film. Examples of polymers for forming films comprise at least one member selected from the group consisting of nylon, cellulose, nitrocellulose, polysulfone, polyacrylonitrile, polyvinylidene fluoride, polypropylene, polyethylene, polybutene, and mixtures thereof. Ceramic separators, such as those based on silicates, can be used.

The battery is not limited to particular shapes, and can take any appropriate shape such as cylindrical shape, a coin shape, and a square shape. The battery is also not limited to particular capacities, and can have any appropriate capacity for both small appliances and power storage for electric cars.

The following examples are intended to illustrate various embodiments of the invention and are not intended to restrict the scope thereof or any claims appended hereto. Examples 1-6 illustrate a process for making crude $Li_2B_{12}F_xZ_{12-x}$ salts. Examples 7-9 illustrate a method to remove impurities comprising OH groups substituted on the $B_{12}$ cage and alkali metal impurities. Example 10 shows that the last equivalent of water associated with the salt comes off most rapidly above 180° C. and preferably above 220° C. Examples 11 and 12 illustrate the difference in efficiency of vacuum drying vs fluidized bed drying of the salt compositions produced in accordance with example 9 (e.g., water levels of 10-20 ppm were obtained). Examples 13 and 14 illustrate molecular sieve drying of electrolyte solutions. Example 15 illustrates the electrochemical impact of traces of water. Examples 16-18 illustrate using the inventive method for removing impurities from a potassium salt.

EXAMPLE 1

Preparation of $Li_2B_{12}F_xH_{12-x}$, where x=10-12

A colorless slurry containing 2.96 g (11.8 mmol) $K_2B_{12}H_{12}CH_3OH$ in 6 ml formic acid at an average Hammett acidity of $H_o$=−2 to −4 was fluorinated at 0 to 20° C. When 100% of the desired $F_2$ (142 mmol) was added as a mixture of 10% $F_2$/10% $O_2$/80% $N_2$, a colorless solution remained. Further fluorination (3%) at 30° C. resulted in precipitation of solid from solution. Solvents were evacuated overnight, leaving 5.1 g of a colorless, friable solid. Analysis of this crude product by $^{19}F$ NMR revealed primarily $B_{12}F_{10}H_2^{2-}$ (60%), $B_{12}F_{11}H^{2-}$ (35%), and $B_{12}F_{12}^{2-}$ (5%). The crude reaction product was dissolved in water and the pH of the solution adjusted to between 4-6 with triethylamine and triethylamine hydrochloride. The precipitated product was filtered, dried, and resuspended in water. Two equivalents of lithium hydroxide monohydrate were added to the slurry and the resulting triethylamine evacuated. Additional lithium hydroxide was added until the pH of the final solution remained at 9-10 after distillation of all triethylamine. Water was removed by distillation and the final product was vacuum-dried at 200° C. for 4-8 hrs. Typical yields of $Li_2B_{12}F_xH_{12-x}$ (x=10,11,12) were ~75%.

EXAMPLE 2

Preparation of $Li_2B_{12}F_xBr_{12-x}$ (x≧10, ave. x=11)

3 g $Li_2B_{12}F_xH_{12-x}$ (x≧10) (0.008 mol) of average composition $Li_2B_{12}F_{11}H$ was dissolved in 160 mL of 1 M $HCl_{(aq)}$. $Br_2$, 1.4 mL (0.027 mol) was added and the mixture refluxed at 100° C. for 4 hours. A sample was taken for NMR analysis.

A portion of the above sample was returned to reflux and chlorine was added over a period of 6 hrs to form the more potent brominating agent BrCl. At the completion of chlorine addition, an aliquot was taken and NMR analysis showed the composition of the aliquot to be identical to the composition of the first aliquot. HCl and water were distilled away and the product was vacuum dried at 150° C. A total of 2.55 g white solid product was isolated. Theoretical for $Li_2B_{12}F_xBr_{12-x}$ (x≧10, ave. x=11) is 3.66 g.

EXAMPLE 3

Preparation of $Li_2B_{12}F_xCl_{12-x}$ (ave. x=11)

20 g $Li_2B_{12}F_{11}H$ mixture dissolved in 160 mL 1 M HCl in a three neck round bottom flask fitted with a reflux condenser and fritted bubbler. The mixture was heated to 100° C. and $Cl_2$ gas was bubbled through at 15 standard cubic centimeter (sccm/min) The effluent, through the condenser, was passed through a solution of KOH and $Na_2SO_3$. After 16 hours of bubbling $Cl_2$, the solution was purged with air. The HCl and water were distilled out and the residue was titrated with ether. Upon ether evaporation and vacuum oven drying of the white solid, 20 g of material of the above formula were recovered (92%). $^{19}$F-NMR in $D_2O$: −260.5, 0.035 F; −262.0, 0.082 F; −263.0, 0.022 F; −264.5, 0.344 F; −265.5, 0.066 F; −267.0, 0.308 F; −268.0, 0.022 F; −269.5, 1.0 F. $^{11}$B-NMR in $D_2O$: −16.841; −17.878

EXAMPLE 4

Preparation of $Li_2B_{12}F_xCl_{12-x}$ (ave. x=3)

3.78 g $K_2B_{12}F_3H_9$ mixture dissolved in 100 mL 1 M HCl in a three neck round bottom flask fitted with a reflux condenser and fritted bubbler. The mixture was heated to 100° C. and $Cl_2$ gas was bubbled through at 15 sccm. The effluent, through the condenser was passed through a solution of KOH and $Na_2SO_3$. After 8 hours of bubbling $Cl_2$, the solution was purged with air. There was some precipitate that formed and it was filtered out. The solution was brought to a pH of 9 by the addition of $Et_3N$ which produced a white precipitate. The solution was cooled to 0° C. to maximize precipitation and then filtered on a Buchner funnel and washed with cold water. The solid was dried in a vacuum at 120° C. 4.62 g of a composition of the above formula was recovered. $^{19}$F-NMR in acetone-$d_6$: −225.2, 0.023 F; −228.5, 0.078 F; −229.5, 0.082 F; −231.2, 0.036 F; −232.8, 0.302 F; −233.2, 0.073 F; −234.3, 0.032 F; −235.5, 0.104 F; −237.6, 0.239 F; −238.4, 0.037 F; −239.8, 0.057 F; −242.0, 0.033 F. $^{11}$B-NMR in acetone-$d_6$: −6 multiplet; −15 multiplet.

EXAMPLE 5

Preparation of $Li_2B_{12}F_xCl_{12-x}$ (ave. x=11)

3 g $Li_2B_{12}F_{11}H$ mixture dissolved in 110 mL 1 M HCl in a three neck round bottom flask fitted with a reflux condenser and fritted bubbler. 1.4 mL $Br_2$ was added. The mixture was heated to 100° C. for 4 hours. An aliquot was removed for NMR analysis. The mixture was again heated to 100° C. and $Cl_2$ gas was bubbled through at 15 sccm. The effluent, through the condenser was passed through a solution of KOH and $Na_2SO_3$. After half an hour, the red $Br_2$ solution was yellowish. After another 6 hours of bubbling $Cl_2$, the solution was purged with air. An aliquot was taken for 19F NMR and found to be identical to the first sample. HCl and water were distilled out. The residue was vacuum dried at 150° C. 2.55 g of a composition of the above formula were recovered. $^{19}$F-NMR in $D_2O$: −257.8, 0.024 F; −259.0, 0.039 F; −259.5, 0.040 F; −261.0, 0.028 F; −261.5, 0.028 F; −263.0, 0.321 F; −265.2, 0.382 F; −269.2, 1.0 F.

EXAMPLE 6

Preparation of $Li_2B_{12}F_xCl_{12-x}$ (ave. x=3)

2.48 g $K_2B_{12}F_3H_9$ mixture was dissolved in 100 mL 1M HCl in a round bottom flask fitted with a reflux condenser. The mixture was heated to 100° C. After 8 hours of stirring, the solution was cooled to room temperature and left over the weekend. The excess $Br_2$ was neutralized with $Na_2SO_3$ and the solution was brought to a pH of 9 by the addition of $Et_3N$ which produced a white precipitate. The solution was cooled to 0° C. to maximize precipitation and then filtered on a Buchner funnel and washed with cold water. The solid was dried in a vacuum at 120° C. $^{19}$F-NMR in acetone-$d_6$: −212.2, 0.030 F; −213.6, 0.284 F; −216, 0.100 F; −217.0, 0.100 F; −217.9, 0.100 F; −219.3, 1.0 F; −221.3, 0.201 F; −222.5, 0.311 F; −223.2, 0.100 F; −225.2, 0.100 F; −225.5, 0.639 F; −226.6, 0.149 F; −229, 0.245 F; −232.0, 0.120 F. Metathesis with $LiOH·H_2O$ was carried out as in Example 1. A composition described by the above formula was obtained.

EXAMPLE 7

Purification of $Li_2B_{12}F_xZ_{12-x}$ from $Li_2B_{12}F_xZ_y(OH)_{12-x-y}$

In this example 50.5 g of partially fluorinated lithium fluorododecaborate salt having an average composition $Li_2B_{12}F_9H_3$, and also containing ~10 mol. % of $Li_2B_{12}F_9H_2(OH)$ (an average composition of hydroxyl-substituted anions), was dissolved in 250 ml of 5-methyl-2-hexanone. The small amount of insoluble material was removed on the centrifuge and the clear solution was eluted via a column containing neutral alumina. The lithium salt was extracted from the eluent with 4×75 ml of water. Aqueous fraction was washed with 3×100 ml of hexanes and water was distilled off. The solid was dried under vacuum at 150° C. to give 38.6 g of white powder, having an average composition $Li_2B_{12}F_9H_3$ and having undetectable by NMR or IR levels of hydroxyl-derivatives of fluoroborate anions (<1000 ppm). Alumina column was washed with 600 ml of water, water was distilled off and the residue was dried under vacuum at 150° C. to give 5.8 g of tan solid, which was mostly lithium salt with average composition $Li_2B_{12}F_9H_2(OH)$. Thus, using this method lithium fluorododecaborate salts can be purified from the fluorinated hydroxyl derivatives.

EXAMPLE 8

Purification of $Li_2B_{12}F_{12}$ from $Li_2B_{12}F_{11}(OH)$

In this example 100.8 g of crude $Li_2B_{12}F_{12}$, containing ~1 mol. % of $Li_2B_{12}F_{11}(OH)$, was dissolved in 400 ml of 5-methyl-2-hexanone. The small amount of insoluble material was removed on the centrifuge and the clear solution was eluted via a column containing neutral alumina. The compound $Li_2B_{12}F_{12}$ was extracted from the eluent with 4×125 ml of water. Aqueous fraction was washed with 3×100 ml of hexanes and water was distilled off. The solid was dried under vacuum at 200° C. to give 87 g of white $Li_2B_{12}F_{12}$, which had non-detectable levels (by NMR or IR) of $Li_2B_{12}F_{11}(OH)$ (note that in a separate experiment, ~0.02 mol. % of $Li_2B_{12}F_{11}(OH)$ (~200 ppm) were detected in $Li_2B_{12}F_{12}$ by NMR using the difference in $^{19}F$ NMR spectra of these two compounds). Thus, using this method $Li_2B_{12}F_{12}$ containing <200 ppm of hydroxyl-derivatives of fluorododecaborate anions (<~10 ppm of hydroxyl group) can be prepared.

EXAMPLE 9

Purification of $Li_2B_{12}F_{12}$ from Sodium and Potassium

An aqueous solution of $Li_2B_{12}F_{12}$ containing ~200 ppm of sodium was eluted via a column with cation-exchange resin DOWEX 50WX8-200 in $Li^+$ form. Water was distilled off from the eluent and the residue was dried under vacuum at 150° C. The purified salt $Li_2B_{12}F_{12}$ contained ~60 ppm of sodium, as determined by ICP.

EXAMPLE 10

Thermal Gravimetric Analysis(TGA)/IR of $Li_2B_{12}F_{12}$

TGA/IR analyses were performed on $Li_2B_{12}F_{12}$ by ramping the sample in the TA 2960 SDT by heating from RT to 800° C. at 10° C./min. in 100 cc/min. of $N_2$, $H_2O$ saturated $N_2$ or air. The evolved gas is passed through a 10 cm IR gas cell. The IR spectrum is collected at 4 $cm^{-1}$ resolution and a gain of 1 on the AVATAR IR. The spectra are collected as a series of spectra at 1-minute intervals. Profiles of the evolved gases were prepared by measuring the absorbance for different compounds at the band maximum in the IR spectra. The quantitative information was derived by multiplying the area under the profile curve by the calibration factor and dividing by the sample weight. The IR profiles shown in FIG. 1 show that under $N_2$ purge most of the water comes off this sample at ~190° C., and it is still being removed at 225° C. Final water removal at or below 180° C. will proceed relatively slowly.

COMPARATIVE EXAMPLE 11

Vacuum Drying of $Li_2B_{12}F_xZ_{12-x}$ Salts

Approximately 200 g $Li_2B_{12}F_{12}$ salt prepared according to example 1 was ground and dried under a dynamic vacuum of 30 mTorr for 8 hrs at 250° C. The sample was transferred to an argon-filled inert atmosphere dry-box. Moisture analysis of our salt was carried out on an Orion AF7 Coulometeric Karl—Fischer Titrator. Hydranal™ Karl-Fischer reagents and standards from Riedel-de Haen were used. ~0.60 g $Li_2B_{12}F_{12}$ was dissolved in 3 ml dry acetonitrile and 3-1 mL were taken for water analysis. After this drying procedure water values of ~100 ppm on a salt weight basis were obtained. Vacuum drying in this manner typically gave water readings of 100-500 ppm.

EXAMPLE 12

Drying of $Li_2B_{12}F_xZ_{12-x}$ in a Fluidized Bed

Approximately 100 g $Li_2B_{12}F_{12}$ salt prepared according to example 1 was ground and dried under a dynamic vacuum of 100 mTorr at 150-200° C. for 4 hrs. The sample was further ground and loaded on to a quartz frit in a vertical glass tube. The tube was externally heated to 260° C. and dry nitrogen was purged through the salt at a sufficient rate to fluidize the bed of salt. After 12 hrs the sample was cooled and transferred to an argon filled inert atmosphere box for analysis of water content. Karl-Fischer analysis performed as in example 7 showed the salt contained 10-20 ppm water on a salt weight basis.

EXAMPLE 13

Drying of Electrolyte Solution Comprising a Combination of $Li_2B_{12}F_{12}$ in 1:1 Ethylene carbonate (EC):Diethylene carbonate (DEC)

Approximately 100 g of a solution comprising ~10 g $Li_2B_{12}F_{12}$ salt, prepared according to example 1, combined with ~90 g of a 50:50 weight % mixture of EC and DEC was measured to have a water content>100 ppm. The solution was stored over dry 4 A molecular sieves for 4 hrs and then decanted on to fresh, dry 4 A molecular sieves for an additional 8 hrs. After filtration the solution was found to contain between 5-15 ppm water by Karl-Fischer analysis. $^9F$ NMR showed no evidence of hydrolysis of the $B_{12}F_{12}^{2-}$ anion

COMPARATIVE EXAMPLE 14

Drying of Electrolyte Solution Comprising a Combination of Mixtures of $Li_2B_{12}F_{12}$ and $LiPF_6$ in 1:1 Ethylene carbonate (EC):Diethylene carbonate (DEC)

When an attempt was made to dry a solution comprising a mixture of 9 wt. % $Li_2B_{12}F_{12}$ and 1 wt. % $LiPF_6$ in combination with EC:DEC by the method of example 12, hydrolysis of the $PF_6^-$ anion to $PO_2F_2^-$ and HF was observed by $^{19}F$ NMR, while no evidence of $B_{12}F_{12}^{2-}$ hydrolysis was observed.

EXAMPLE 15

Determination of Oxidative and Reductive Stability and Decomposition Temperature of Lithium Electrolyte Solutions for Use in Lithium Secondary Batteries To assess the oxidative stability of substituted dodecaborates as battery electrolytes, and the impact of OH containing impurities, cyclic voltammetry (CV) experiments were performed using CH Instruments potentiostat and a conventional three-electrode cell under laboratory atmosphere. Two solutions each containing 0.4 M $Li_2B_{12}F_{12}$ salt were prepared using EC:DEC (3:7) solvents. The salt used in one of the solutions contained >100 ppm water and the salt used in the second solution contained <20 ppm water as an impurity (and were produced in accordance with Example 12. Cyclic voltammetry was carried out to evaluate the oxidation characteristics of the two salt solutions. The working electrode was Pt (1.6 mm diameter). The reference and the counter electrodes were both lithium foils. The scan rate was 20 mV/s.

Figure 2:
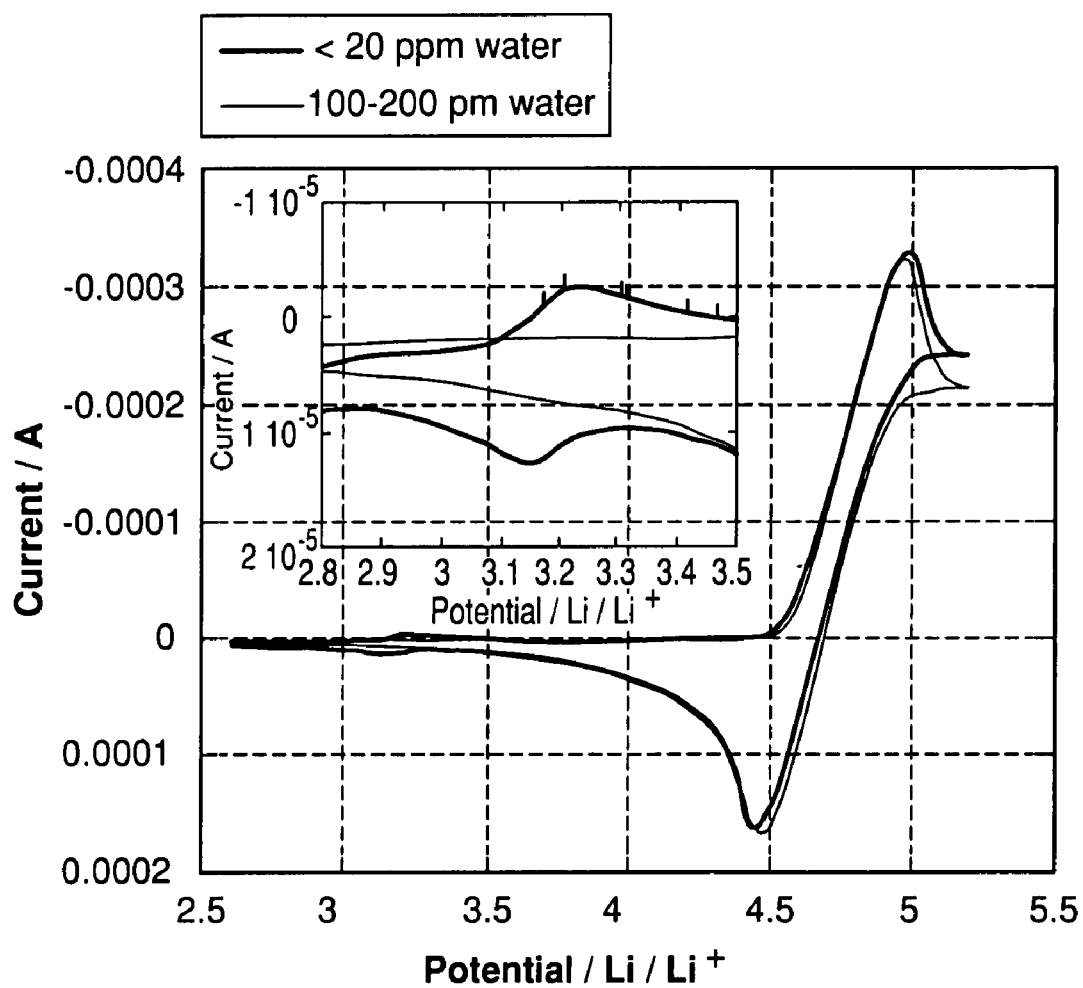
FIG. 2 is a cyclic voltammetry graph illustrating the affect of OH impurities.

The CV results are represented graphically in FIG. 2. Referring now to FIG. 2, FIG. 2 shows that $Li_2B_{12}F_{12}$ containing only 100-200 ppm water has observable electrochemistry at ~3 V vs lithium. Because this is well within the electrochemical window of lithium ion cells water is shown to have a deleterious affect on electrolyte performance (and in turn adversely affect battery performance).

EXAMPLE 16

Purification of $K_2B_{12}F_xZ_{12-x}$ from $K_2B_{12}F_xZ_y(OH)_{12-x-y}$

In this example 12.5 g of 20 wt % solution of potassium salt in acetonitrile having an average composition $K_2B_{12}F_{11}H$, and also containing ~2,000 ppm of $K_2B_{12}F_{11}H(OH)$ (as determined by liquid chromatography method), was agitated with 4.0 g of activated neutral aluminum oxide (powder, ~150 mesh) for 16 hours. Alumina was filtered out and liquid chromatography analysis indicated that purified solution contained less than ~10 ppm of hydroxyl-substituted clusters.

EXAMPLE 17

Purification of $K_2B_{12}F_xZ_{12-x}$ from $K_2B_{12}F_xZ_y(OH)_{12-x-y}$

In this example 12.5 g of 20 wt % solution of potassium salt in acetonitrile having an average composition $K_2B_{12}F_{11}H$, and also containing ~2,000 ppm of $K_2B_{12}F_{11}H(OH)$ (as determined by liquid chromatography method), was agitated with 4.0 g of activated granular basic aluminum oxide (1 mm beads) for 16 hours. Alumina was filtered out and liquid chromatography analysis indicated that purified solution contained less than ~10 ppm of hydroxyl-substituted clusters.

EXAMPLE 18

Purification of $K_2B_{12}F_xZ_{12-x}$ from $K_2B_{12}F_xZ_y(OH)_{12-x-y}$

In this example 12.5 g of 20 wt % solution of potassium salt in acetonitrile having an average composition $K_2B_{12}F_{11}H$, and also containing ~2,000 ppm of $K_2B_{12}F_{11}H(OH)$ (as determined by liquid chromatography method), was agitated with 4.0 g of titanium oxide for 16 hours. Titanium oxide was filtered out and liquid chromatography analysis indicated that purified solution contained less than ~10 ppm of hydroxyl-substituted clusters.

While the above Description emphasis removing impurities from materials and precursors that are employed in a lithium ion battery, the instant invention can be used for removing impurities from a wide range of materials. Further while the invention has been described in detail and with reference to specific examples thereof, it will be apparent to one skilled in the art that various changes and modifications can be made therein without departing from the spirit and scope thereof.

The invention claimed is:

1. A method for treating lithium salt wherein the lithium salt comprises $Li_2B_{12}F_xH_{12-x-y}Z_y$ where x+y is from 3 to 12, and x and y are independently from 0 to 12, and Z comprises at least one of Cl and Br; the method comprising at least one step selected from the group consisting of:

step a) dissolving the lithium salt in an aprotic organic solvent to form a solution and passing said solution through an adsorbent column, step b) dissolving the lithium salt in a solvent to form a solution, and passing said solution through a cation exchange column in Li$^+$ form, step c) drying the lithium salt at greater than about 180° C. under vacuum or nitrogen purge, and step d) dissolving the lithium salt in an aprotic organic solvent to form a solution and passing said solution through a Li-substituted molecular sieve, then;

recovering treated lithium salts.

2. The method of claim 1 wherein the step comprises step b.

3. The method of claim 1 wherein the step comprises step c.

4. The method of claim 1 wherein the step comprises step d.

5. The method of claim 1 wherein the step comprises step a.

6. The method of claim 1 wherein the recovered treated lithium salt is substantially free of water, HF and non-lithium metal cations.

7. The method of claim 1 wherein the alkali or alkaline earth content of the recovered treated lithium salt is less than about 500 ppm.

8. The method of claim 1 wherein the total hydroxyl level of the recovered treated lithium salt is less than about 500 ppm.

9. The method of claim 1 wherein the adsorbent of step a comprises at least one member selected from the group consisting of alumina, titania, silica and carbon.

10. The method of claim 9 wherein the adsorbent comprises alumina.

* * * * *